(12) United States Patent
Meincke et al.

(10) Patent No.: US 10,766,214 B2
(45) Date of Patent: Sep. 8, 2020

(54) DEVICE AND TRANSPORT DEVICE FOR HANDLING TYRE BLANKS

(71) Applicant: HARBURG-FREUDENBERGER MASCHINENBAU GMBH, Hamburg (DE)

(72) Inventors: Rudiger Meincke, Hamburg (DE); Margiciok Wojcieck, Hamburg (DE)

(73) Assignee: HARBURG-FREUDENBERGER MASCHINENBAU GMBH, Hamburg (DE)

(*) Notice: Subject to any disclaimer, the term of this patent is extended or adjusted under 35 U.S.C. 154(b) by 0 days.

(21) Appl. No.: 16/704,809

(22) Filed: Dec. 5, 2019

(65) Prior Publication Data

US 2020/0114605 A1    Apr. 16, 2020

Related U.S. Application Data (63) Continuation of application No. 15/519,889, filed as application No. PCT/DE2015/000557 on Nov. 17, 2015, now abandoned.

(30) Foreign Application Priority Data

Nov. 18, 2014    (DE) .......................... 10 2014 017 148

(51) Int. Cl.
     *B29D 30/00*    (2006.01)
(52) U.S. Cl.
     CPC .. *B29D 30/0016* (2013.01); *B29D 2030/0022* (2013.01); *B29D 2030/0038* (2013.01)

(58) Field of Classification Search
     CPC ........ B29D 30/0016; B29D 2030/0038; B29D 2030/0022
     See application file for complete search history.

(56) References Cited

U.S. PATENT DOCUMENTS

| | | |
|---|---|---|
| 3,131,961 A | 5/1964 | Van Doros |
| 3,337,173 A | 8/1967 | Soderquist |
| 3,393,807 A | 7/1968 | Sylvester |
| 4,236,883 A | 12/1980 | Turk |
| 4,304,619 A | 12/1981 | Riggs |
| 4,585,405 A | 4/1986 | Capecchi |
| 4,608,219 A | 8/1986 | Singh |
| 4,637,644 A * | 1/1987 | Trethowan ......... B29D 30/0016 294/86.4 |
| 4,758,401 A | 7/1988 | Rach |
| 5,206,031 A | 4/1993 | Siegenthaler |

(Continued)

FOREIGN PATENT DOCUMENTS

| | | |
|---|---|---|
| EP | 2025487 A1 | 2/2009 |
| GB | 984178 A | 2/1965 |

(Continued)

*Primary Examiner* — Stanton L Krycinski
(74) *Attorney, Agent, or Firm* — Lucas & Mercanti, LLP; Klaus P. Stoffel (57) ABSTRACT

A blank stand for receiving and/or temporarily storing at least one tire blank and to a logistics system for realizing a flow of material of tire blanks to tire manufacturing plants with at least one blank stand, wherein the blank stand and the further components of the logistics system are designed such that handling and transport functions are supported in different height levels relative to a floor level of the hall.

11 Claims, 7 Drawing Sheets

(56) References Cited

U.S. PATENT DOCUMENTS

| | | | |
|---|---|---|---|
| 5,395,150 | A | 3/1995 | Imler |
| 6,499,980 | B1 * | 12/2002 | Fledderjohann ..... B29D 30/005 414/222.01 |
| 6,558,495 | B2 | 5/2003 | Bagnasco |
| 6,890,165 | B2 | 5/2005 | Ichimaru |
| 7,740,788 | B2 | 6/2010 | Yoshino |
| 7,744,359 | B2 | 6/2010 | Himeno et al. |
| 8,006,849 | B2 | 8/2011 | Pickard |
| 8,161,650 | B2 | 4/2012 | Lawson |
| 8,337,187 | B2 | 12/2012 | Hineno |
| 8,449,281 | B2 | 5/2013 | Takada |
| 8,769,807 | B2 | 7/2014 | Lawson |
| 8,939,486 | B2 * | 1/2015 | Gorham ................. B25J 15/10 294/93 |
| 9,145,260 | B2 | 9/2015 | Miyazaki |
| 9,296,166 | B2 * | 3/2016 | Takagi ................ B25J 15/0052 |
| 9,409,359 | B2 | 8/2016 | Thalgott et al. |
| 2015/0014121 | A1 | 1/2015 | Slot |

FOREIGN PATENT DOCUMENTS

| | | |
|---|---|---|
| JP | 57174235 A | 10/1982 |
| JP | 58122841 A | 7/1983 |
| JP | 08267606 A | 10/1996 |
| SU | 532531 A1 | 10/1976 |
| WO | 2013182772 A1 | 12/2013 |

* cited by examiner

DEVICE AND TRANSPORT DEVICE FOR HANDLING TYRE BLANKS

CROSS-REFERENCE TO RELATED APPLICATIONS

The present application is a Continuation Application of U.S. patent application Ser. No. 15/519,889, filed Apr. 18, 2017, which is a 371 of International Application PCT/DE2015/000557, filed Nov. 17, 2015, which claims priority of DE 10 2014 017 148.5, filed Nov. 18, 2014, the priority of these applications is hereby claimed and these applications are incorporated herein by reference.

BACKGROUND OF THE INVENTION

The invention relates to a blank stand for receiving and/or temporarily storing at least one tire blank, and to a transport installation for implementing a material flow of tire blanks to tire-production plants, having at least one blank stand.

The manufacturing of tires, for example for vehicles such as automobiles or motorcycles, is an extremely complex process which is composed of a multiplicity of manufacturing and process steps. The reason therefor lies in the complicated construction of the tire, which is composed of a significant number of different individual components. In addition, this multiplicity of components has to be interconnected under the effect of pressure and temperature, by so-called vulcanization.

One of the substantial production steps in the manufacturing of tires is the vulcanization of tire blanks to obtain a finished tire. To this end, the tire blank is placed in a mold that is located within a tire-vulcanizing machine and is subsequently heated to the material-dependent vulcanization temperature and also impinged by a vulcanization pressure inside the tire blank. A suitable heating medium having a respective temperature is incorporated under impingement by pressure in the interior of the tire blank in order for the vulcanization temperature and the vulcanization pressure to be attained.

Not only the finished tire as the final product of the tire-manufacturing process, but also already the tire blank, is a highly complex component that is composed of many semi-finished product elements. As a result of the multilayered construction, the individual components initially and prior to a vulcanization procedure have to be assembled, that is to say that the tire components are supplied to a carcass drum in the correct size in a singularized manner so as to be precise in terms of location, position, and orientation, said carcass drum being located within a tire-construction machine. The tire blank is manufactured and prepared for vulcanization in this manner.

Many of the tire components are available as web- and/or sheet-shaped semi-finished products: various rubber mixtures and caoutchouc-based composite materials, woven textile fabrics or textile cord, respectively, woven steel-belt fabrics, and caoutchouc-sheathed bead cores. Layer servers are in some instances used within a tire-construction machine in order for these web- and/or sheet-shaped semi-finished products to be supplied to the carcass drum.

As a result of the significant number of production steps, production sites are implemented in large sheds and comprise machines, installations, and handling means that are suitable for the individual production steps. These production lines or production centers are supplemented by pre-stream and downstream equipment for preparing tire components or for post-processing or packing, respectively, the finished tires.

The tire blanks are typically manufactured by tire-construction machines and are initially stockpiled in a store. The tire blanks, depending on demand, are then continuously or discontinuously retrieved from this store which in practical terms serves as a type of first buffer store for the subsequent manufacturing process, said tire blanks being transported to the tire heating presses in order to be vulcanized in the latter.

The tire heating presses in production sheds having a high production capacity are often beside one another in the manner of rows, and the rows of the machines are separated by vehicle-accessible paths. A supply of the tire blanks in the context of a transport system is often performed using rails which are installed in an upper shed region. Transport and holding installations are displaceable in a controlled manner along the rails. According to one variant of a known production sequence, the rails run above the heat presses, and the tire blanks by way of holding installation which are fitted to chains are lowered into the region of the tire heating press.

These transport systems for tire blanks that often operate automatically and on rails below the shed ceiling transport the tire blanks from a buffer station to the tire-vulcanizing machines. The transport trucks herein run on rails up to the respective heating location and load the blank stand of the tire-vulcanizing machine. The blank stand is located at the level of the shop floor and is thus usually level with the tire-vulcanizing machines. For safety reasons a large safety scanner field is required, since a tire by way of a gripping device is automatically rapidly lowered from above onto the floor level. This safety scanner field requires a large shed area and impedes access to the respective tire-vulcanizing machine. Each disruption has to be confirmed by hand, interrupting the supply of further tire-vulcanizing machines.

According to another design of the handling installations, respective transport rails as the displacement base of the loading systems and supply installations run above the displacement paths, so as to be contiguous to the tire-vulcanizing machines and production stations and so as to correspond to the steps of tire manufacturing. The tire blanks to be vulcanized are positioned by handling installations which are equipped with pivot arms and/or arms that are positionable in another manner, in particular with longitudinal outriggers. As a result of the longitudinal outriggers that are significantly shorter in relation to the transport installations that are provided in the region of the shed ceiling, transport installations above the displacement paths are significantly more rigid and thus the more precisely controllable handling system by way of which a very high accuracy is attainable.

One problem in the use of handling installations that are based on transport rails above the displacement paths so as to be contiguous to the tire-vulcanizing machines lies in providing adequate workplace safety. For an efficient tire production, the tire blanks in the operating region in front of the tire-vulcanizing machine, or of the heating press, respectively, have to be lowered in a relatively rapid manner in order for short production times to be implemented. Therefore, there is a significant risk of accidents in this operating region, and the operators that are located in an unforeseen manner in this region could easily be injured. Therefore, visual monitoring systems which lead to an emergency shutdown of the handling installation when a person enters the monitored region during the handling procedures are employed in order to achieve adequate workplace safety. However, an emergency shutdown of this type results in an interruption of production which often can only be addressed again by way of significant delays.

SUMMARY OF THE INVENTION

It is an object of the present invention to construct a device for the transport and handling of material of the type mentioned at the outset in such a manner that the disadvantages of known solutions are reduced at least in part and simplified handling is supported.

According to the invention, this object is achieved in that at least one blank stand is positioned at a vertical spacing in relation to a shop-floor area and so as to be laterally beside the tire production installations such as heating presses, for example, or tire-vulcanizing machines, respectively. To this end, holding installations into which the tire blanks can be deposited by the handling installations are used between the heating presses and/or tire-vulcanizing machines. The region of movement for the handling installations at least in a lower potential region of collision in this case runs only above the heating presses. A risk to the operating personnel is precluded by the dissimilar height level.

Typically, one receiving installation is disposed beside an assigned heating press or a tire-vulcanizing machine in each case on the left and on the right. A retrieval of the tire blanks from the receiving installations is performed by using grippers which are disposed on the tire heating press. The grippers retrieve the tire blanks from the holding installations depending on demand, and for the vulcanization procedure insert said tire blanks into the molds of the tire heating press.

In principle, a transport procedure that runs in the opposite direction would also be conceivable for the finished vulcanized tires, however the latter post retrieval from the molds are still very hot and easily deformable.

For example, if the blank stand is located 2.5 m above the shop-floor level and optionally is also positioned laterally to the heating press, for example above an optional safety fence that is disposed so as to be lateral to the heating press, the following advantages are derived:
- the space requirement in front of the heating press is significantly reduced, since the automatic loading system operates at a height level without any risk of collision with operating personnel;
- the shop-floor area can be reduced as a result of the utilization of the shed volume on more than one height region, since no or at least only one size-reduced safety scanner field is required;
- at least two tire blanks can be stockpiled and thus quasi buffer-stored in the material-flow direction in front of the heating press, a first tire blank being in the loader/gripper, and at least one second tire blank being in the blank stand;
- apart from the gain in terms of space by way of the reduced or deleted safety scanner field area, the area in front of the heating press remains freely available for potential mold changes;
- no interruption of production arises as a result of the automatic and personnel-independent handling of the tire blank by the loading system and the feeding installation.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
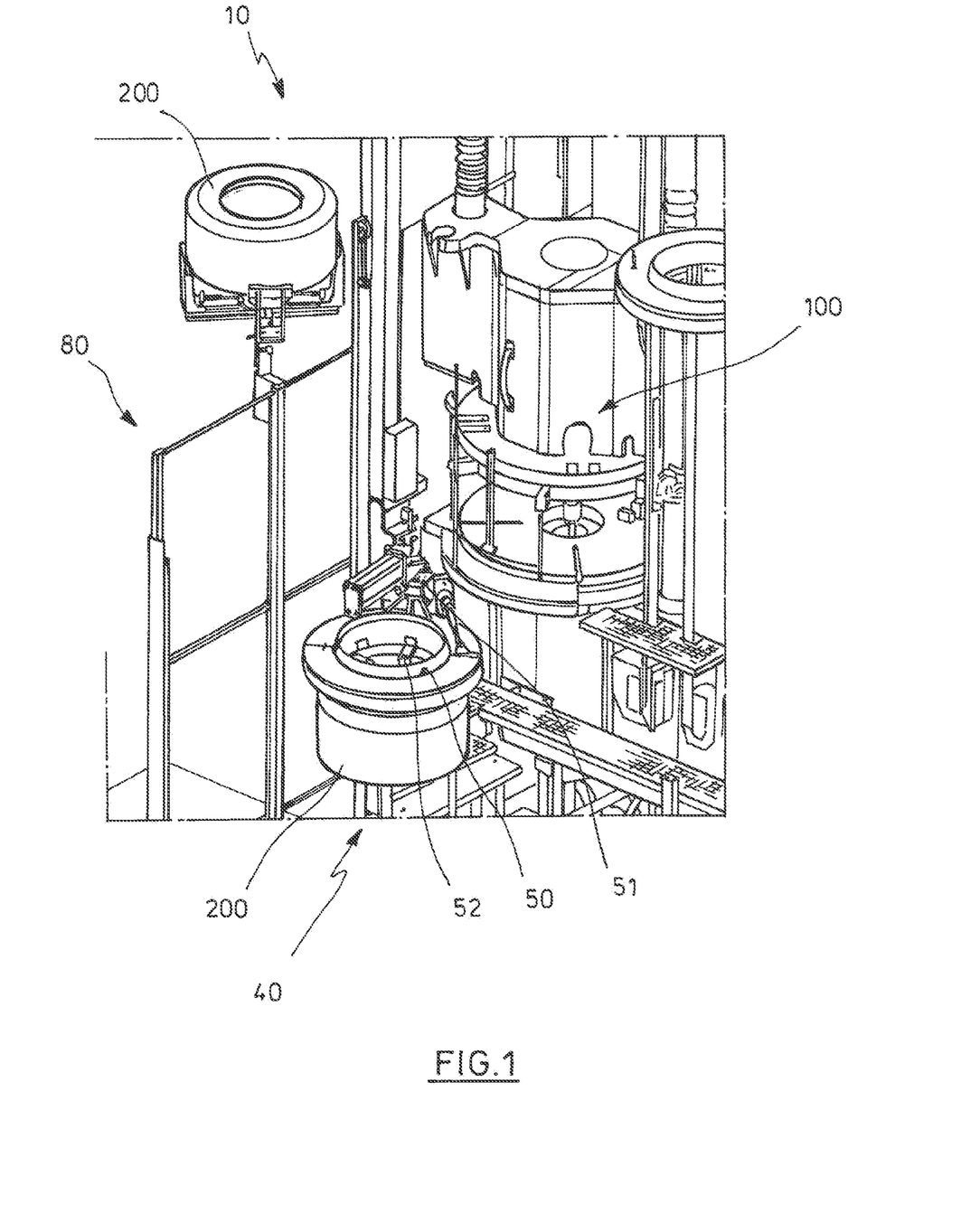
FIG. 1 shows a perspective overview for visualizing the handling of tire blanks in the context of a loading system that preferably operates automatically.

FIG. 1 shows a perspective overview for visualizing the handling of tire blanks in the context of a loading system that preferably operates automatically, having the blank stand (10) according to the invention.

The blank stand (10) according to the teachings of the invention herein is disposed at a height level above the shop floor and thus also above the tire-production plant (100) to be fed. The blank stand (10) in the present exemplary embodiment according to FIG. 1 is secured at the top, so as to be at the end side of a safety fence (80) that is provided laterally to the tire-production plant (100).

The safety fence (80) in terms of function is utilized in two ways by way of this chosen arrangement. The fence serves both as access restriction to the contiguous and safety-relevant operating space of the loading system (40), and also as a holding device for the blank stand (10).

The arrangement of the blank stand (10) is performed in such a manner that the latter lies both in the operating region of the loading system (40) as well as in the operating region of handling installations for supplying and feeding the blank stand (10) with tire blanks. The loading system (40) disposes of a handling device (50) which by means of at least one outrigger (51) is coupled to installations of linear and/or rotary motion drives. The handling device (50) comprises a gripper (52) for receiving a tire blank (200) and by way of the motion drives is displaceable in the linear and rotary direction of movement in such a manner that both receiving of a tire blank (200) out of or from, respectively, the blank stand (10) as well as feeding of the tire-production plant (100) with the tire blank (200), and all positions of movement between these spatial fixed points that are preferably implemented as terminal positions, are supported.

The gripper (52) of the handling device (50) is preferably embodied as an internal gripper, gripping the tire blank (200) on the inside or on the tire bead. The blank stand (10) is preferably designed in such a manner that tire blank (200) in regions is held by way of the external contour of the latter. In this way, receiving of the tire blank (200) from the blank stand (10) can be performed by the handling device (50) in a reliable and uncomplicated manner in that the active areas for the temporary force-fitting connection during the buffering position in the blank stand (10) and the handling process in the loading system (40) are different.

Figure 2:
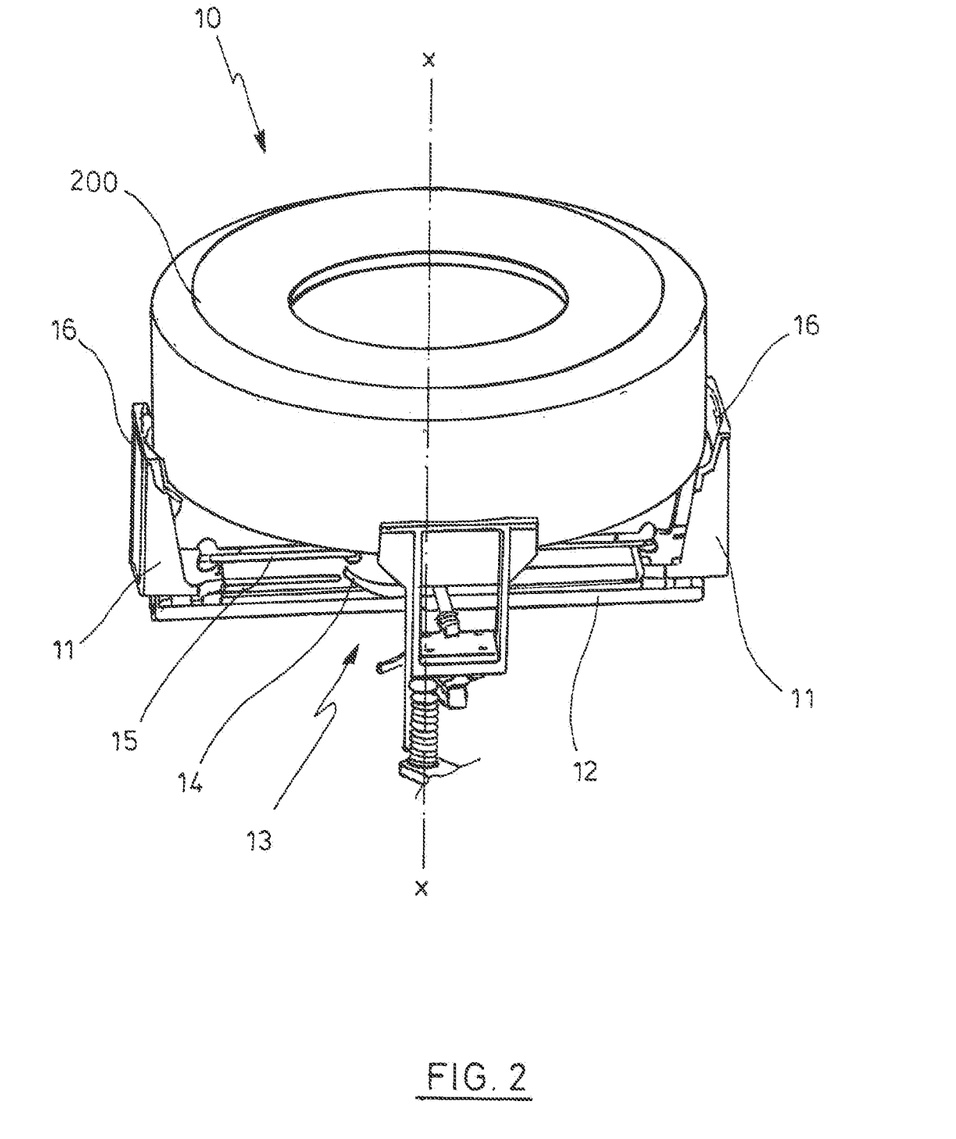
FIG. 2 shows a perspective view of the blank stand (10) according to the invention, having a received tire blank (200)

FIG. 2 depicts the blank stand (10) according to the invention, having a received tire blank (200), in a perspective view. The construction of the blank stand (10) is implemented by way of at least three gripping holders (11) which are preferably disposed so as to be movable in a linear manner in the radial direction in relation to a central axis x-x, and on a radial frame (12). In order for a rotationally symmetrical object, a tire blank (200) also being one of the latter, to be able to be supported, gripped, or clamped in a force-fitting manner, in a statistically determined manner, exactly three contact points that are preferably distributed uniformly on the circumference are required. The tire blank (200) in the present exemplary embodiment of the blank stand (10) is received by four gripping holders (11) in a radial and uniform arrangement.

A drive (13) in the form of a rotary plate (14) that communicates with pull-push rods (15) and is drivable by motive power or by hand and can carry out a linear movement of the gripping holders (11) is provided in the example shown, said rotary plate (14) being disposed centrically in relation to a central axis x-x. In this way, the free gap that is defined by the gripping holders (11) can be adapted to the respective tire-blank diameter. The at least three gripping holders (11) dispose of a stepped active area (16) that is directed toward the tire blank (200) such that holding of the blank (200) is guaranteed in two spatial directions and preferably in the horizontal and the vertical direction.

Alternatively to the embodiment of the blank stand (10) as an external gripper shown in FIG. 2, said blank stand (10) can also be implemented as an internal gripper, wherein in this instance the gripper (52) of the handling device (50) of the loading system (40) is preferably embodied as an external gripper.

Figure 3:
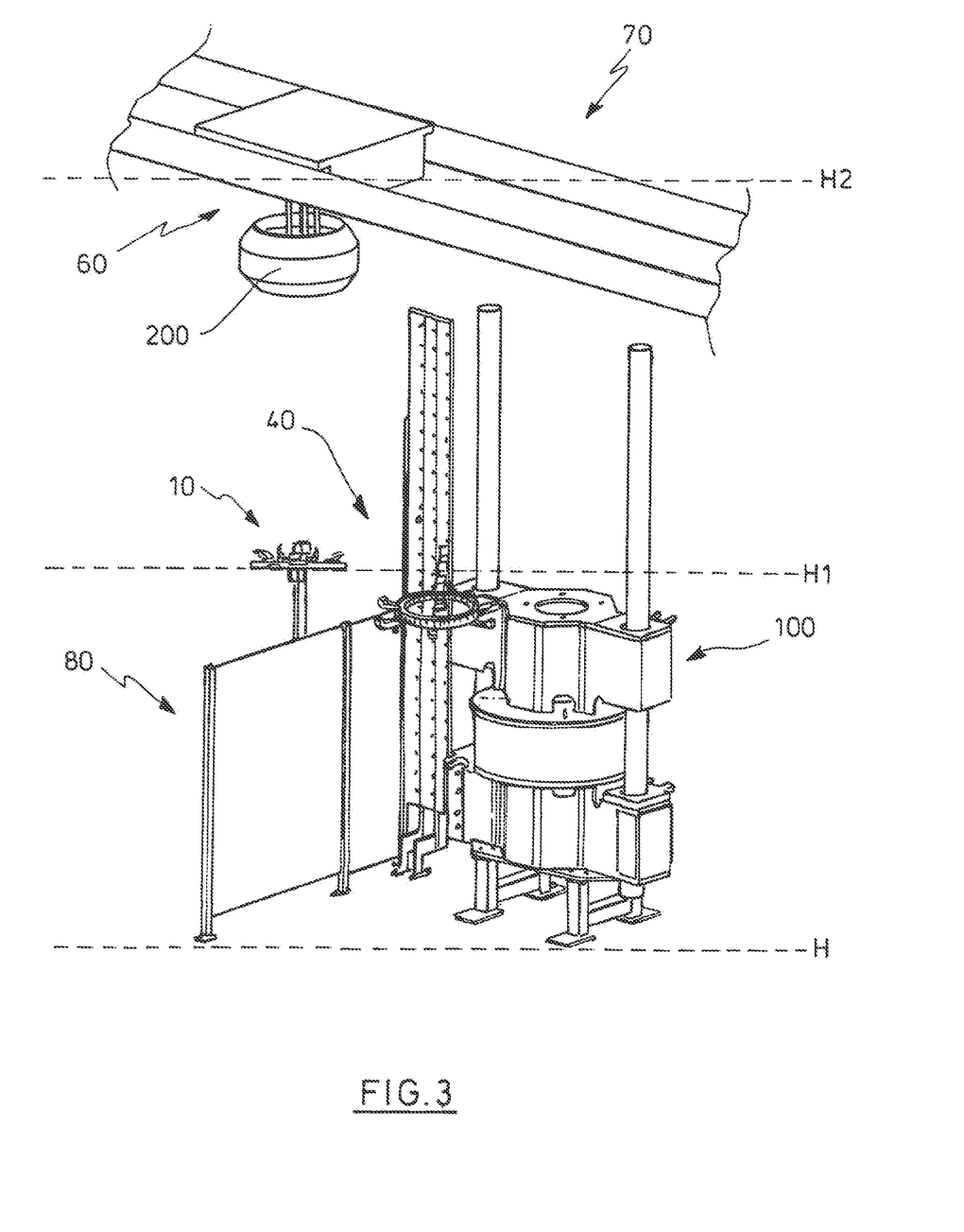
FIG. 3 shows a three-dimensional view of the logistics system (70) according to the invention in a snapshot of the material flow for the supply-related transport of a tire blank (200) by the transport system (60)

FIG. 3 shows a three-dimensional view of the logistics system (70) according to the invention in the state of the material flow for the supply-related transport of a tire blank (200) by the transport system (60). The transport system (60) in the situation shown has received a blank (200), the blank stand (10) on account of no tire blank (200) having been received being in a receiving-standby mode. The blank stand (10) is preferably configured in such a manner that said blank stand (10) can receive two tire blanks (200). As a result of this, a receiving-standby mode of the blank stand (10) can exist even when one tire blank (200) has already been received.

The relevant height-level lines H, H1, H2 are indicated for clarity, in order to illustrate one of the essential concepts of the invention. By way of the displacement of the transport and handling functions out of the shop-floor level (H) to corridors having a first height level (H1) and a second height level (H2), both the scanner safety field that is required for workplace safety as well as the overall space requirement for tire-production plants can be significantly reduced.

The material-flow situation of FIG. 3 can exist either when a tire blank (200) is already located in the tire-vulcanizing machine (100), or the plant is started up.

Figure 4:
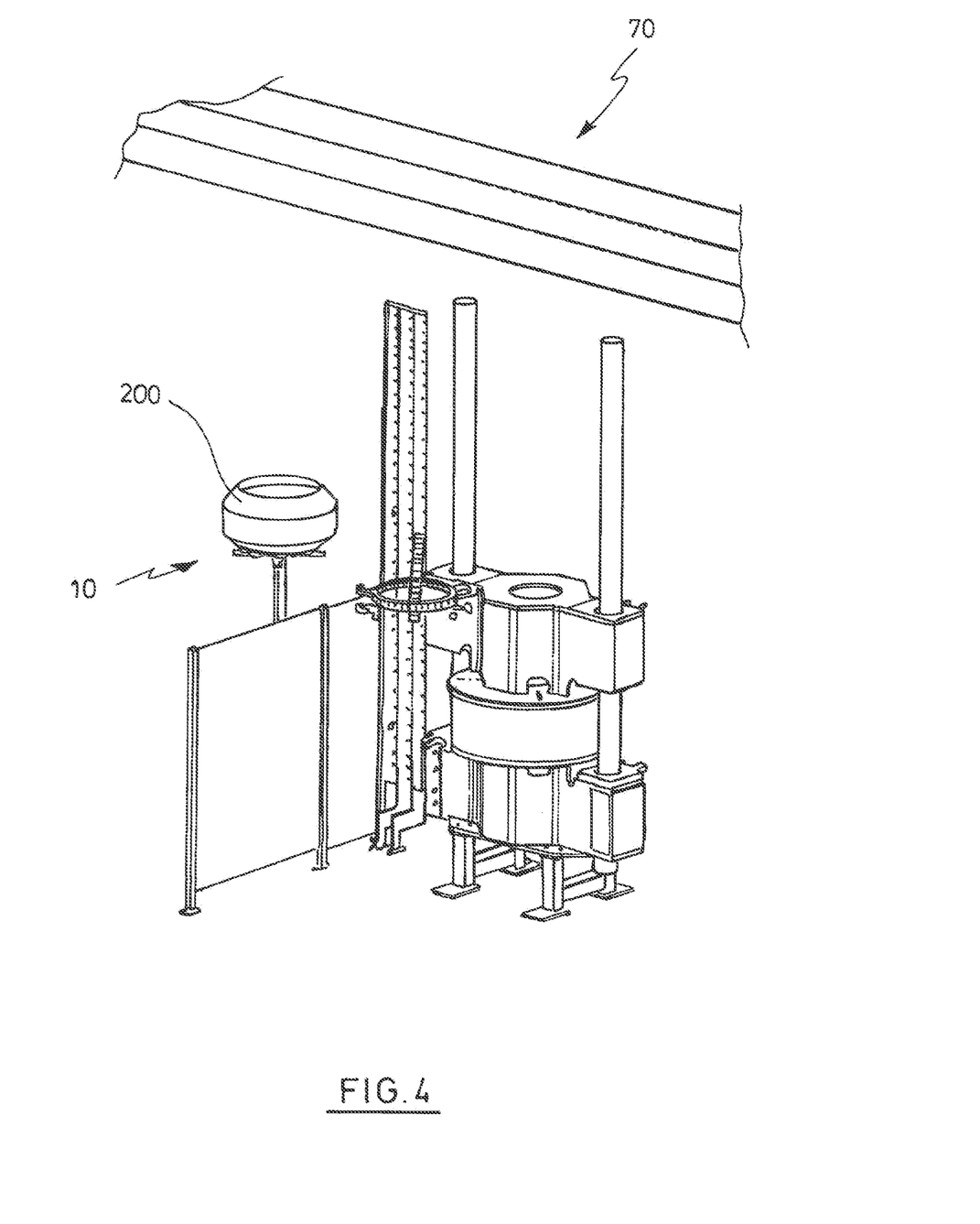
FIG. 4 shows a three-dimensional view of the logistics system (70) according to the invention in a point in time of the material flow, having a tire blank (200) received in the blank stand (10)

FIG. 4 illustrates a three-dimensional view of the logistics system (70) according to the invention, at a point in time of the material flow having tire blank (200) received in the blank stand (10). During this situation shown a blank (200) is buffer-stored by the blank stand; the other elements (60, 60) of the logistics system (70) can implement their assigned handling and/or transport function in a simultaneous or a temporally offset manner.

Figure 5:
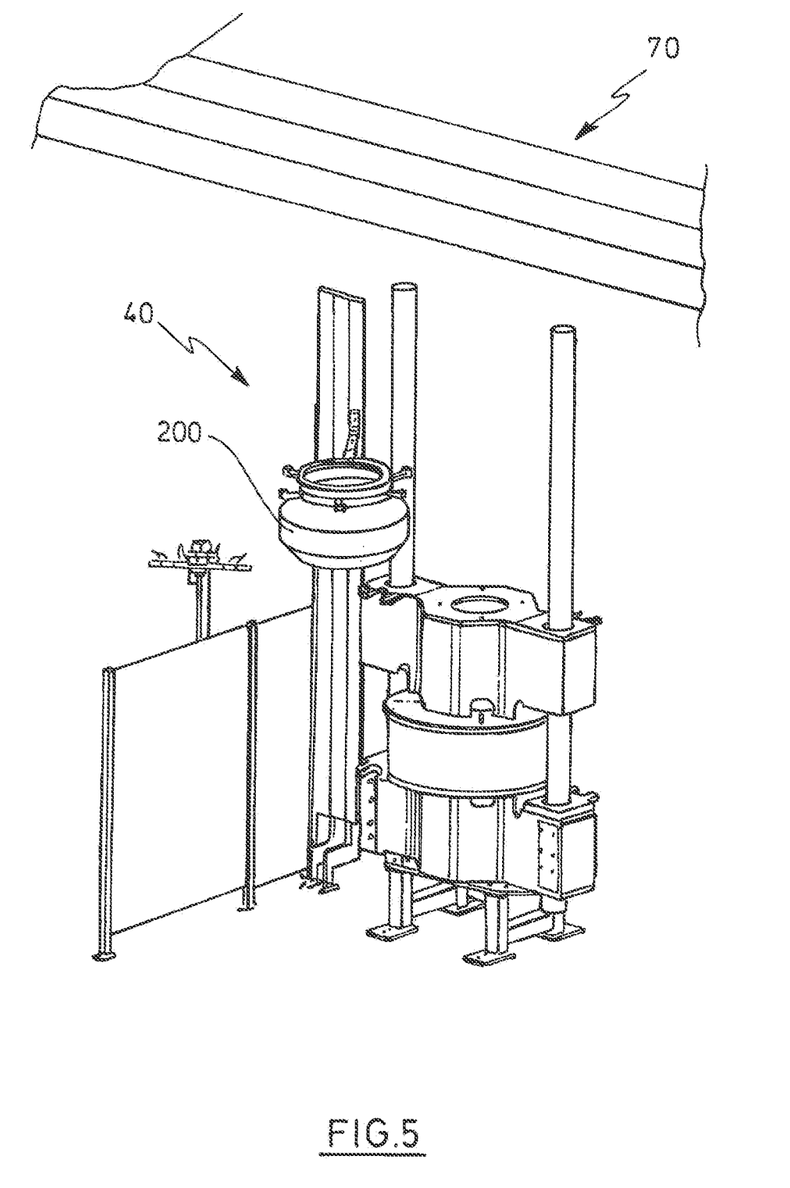
FIG. 5 shows a three-dimensional view of the logistics system (70) according to the invention in a point in time of the material flow, having a tire blank (200) received in the loading system (40)

FIG. 5 depicts the logistics system (70) according to the invention in a three-dimensional view, at a point in time of the material flow having a tire blank (200) received in the loading system (40).

Figure 6:
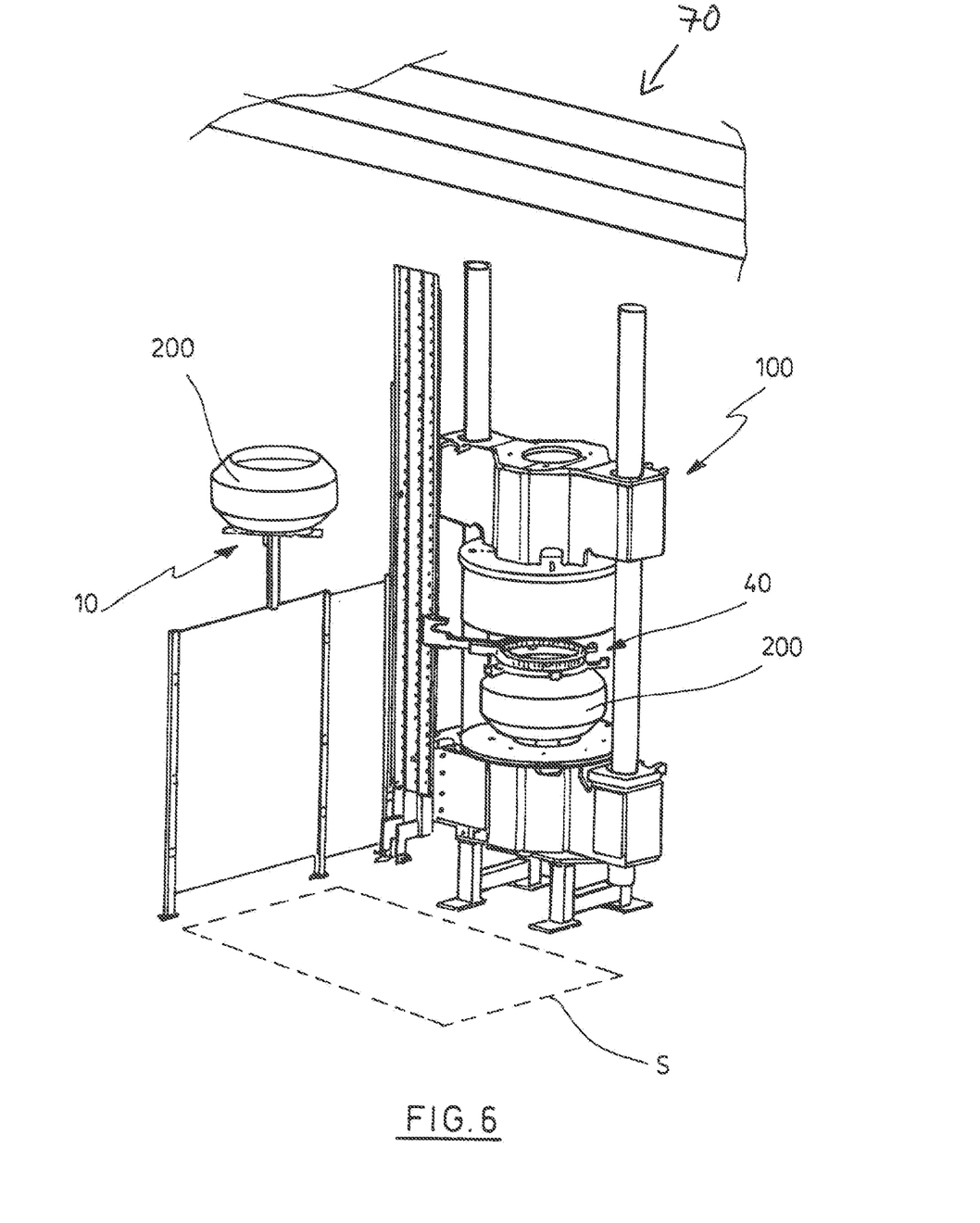
FIG. 6 shows a three-dimensional view of the logistics system (70) according to the invention, having in each case one tire blank (200) received in the blank stand (10) and in the opened tire heating press (100)

FIG. 6 shows a three-dimensional view of the logistics system (70) according to the invention, having in each case one tire blank (200) received in the blank stand (10) and in the opened tire heating press (100). The safety scanner field (S) which must comprise at least that area that can be driven across by the loading system (40) is furthermore illustrated in a qualitative manner.

Figure 7:
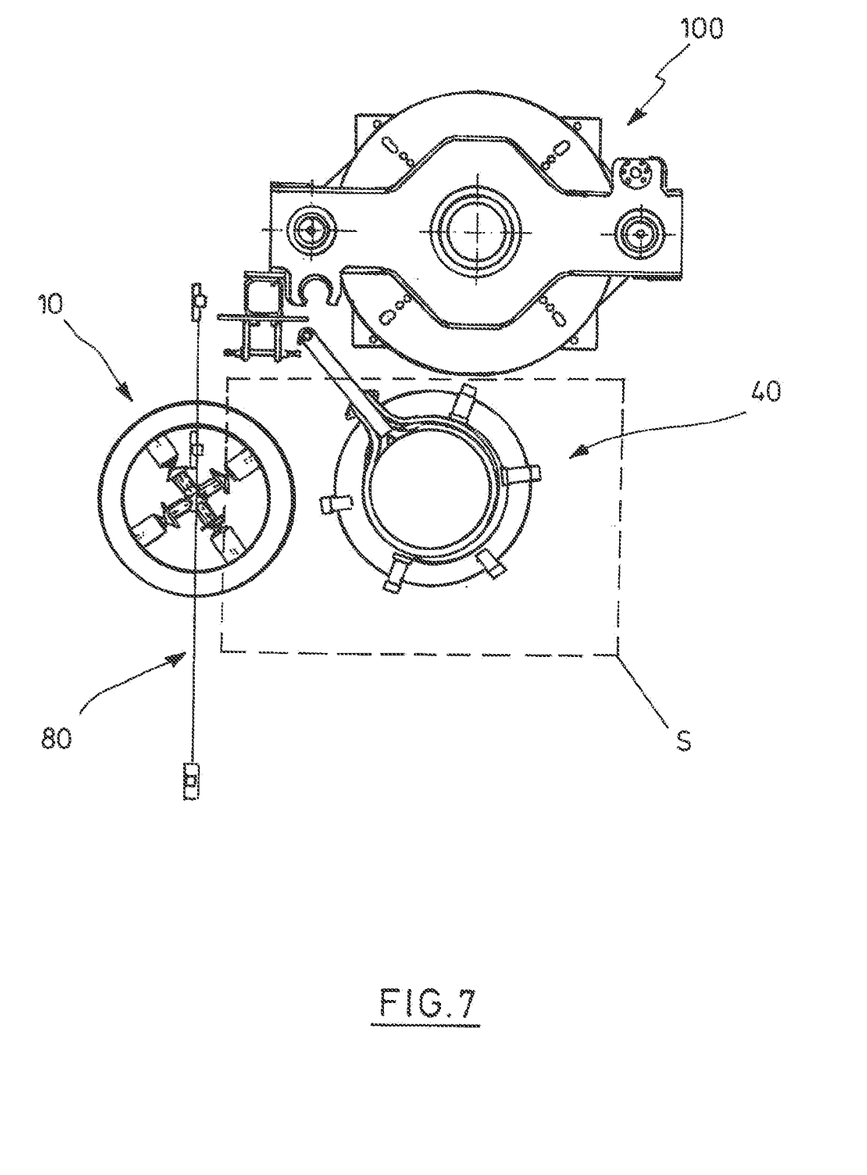
FIG. 7 shows a plan view of the logistics system (70) according to the invention.

FIG. 7 in a plan view elucidates the correlation between the size of the safety scanner field (S) and the surface projection of the degrees of freedom of movement of the loading system (40).

While specific embodiments of the invention have been shown and described in detail to illustrate the inventive principles, it will be understood that the invention may be embodied otherwise without departing from such principles.

We claim:

1. An arrangement, comprising:
a tire-production plant arranged at a shop-floor height level;
a logistics system for implementing a material flow of tire blanks to the tire production plant, the logistics system including at least one loading installation for feeding the tire blanks to the tire production plant, and at least one transport installation arranged at a second height level relative to the shop-floor height level; and
at least one blank stand disposed at a first height level in a material flow direction between the transport installation and the loading installation, wherein the blank stand is arranged next to the tire-production plant to receive and/or temporarily store at least one of the tire blanks, the blank stand including at least three gripping holders for holding the at least one tire blank, the gripping holders being arranged to receive the tire blank on a rotationally symmetrical area and to have a free gap between the gripping holders that corresponds to the rotationally symmetrical area,
wherein the blank stand includes a frame, the at least three gripping holders being arranged on the frame,
wherein the at least three gripping holders for holding at least one tire blank are disposed so as to be movable radially relative to a central axis so that the free gap for receiving the tire blank is variable so that the tire blank is receivable on a rotationally symmetrical external or internal area.

2. The arrangement according to claim 1, further comprising a drive, wherein the at least three gripping holders for holding at least one tire blank are movable by way of the drive, the drive having at least one rotary plate and in each case one pull-push rod assigned to one of the gripping holders.

3. The arrangement according to claim 2, wherein the drive is configured so as to be operated by motive power or by hand.

4. The arrangement according to claim 1, wherein the at least three gripping holders for holding at least one tire blank each have one stepped active area so that holding of the tire blank is supported in at least two spatial directions.

5. The arrangement according to claim 1, wherein the blank stand is disposed adjacent to the tire-production plant as a buffer storage of the at least one tire blank.

6. The arrangement according to claim 5, wherein the at least one blank stand is arranged at the height level above the shop floor having the tire-production plant to be fed, so that a size-reduced safety scanner field is supported.

7. The arrangement according to claim 1, wherein the at least one blank stand is disposed at the first height level above the shop floor having the tire-production plant to be fed so that the blank stand is feedable by the transport installation at the second height level above the blank stand having the at least one tire blank.

8. The arrangement according to claim 1, wherein the at least one blank stand is secured to or arranged on a safety fence at the height level above the shop floor.

9. The arrangement according to claim 1, wherein dissimilarities between the first and second height levels support an area-reduced safety scanner field.

10. The arrangement according to claim 1, wherein the at least one blank stand is arranged to reduce displacement paths of the transport installation and the loading installation so that loading times are reduced and/or positioning accuracy is enhanced.

11. The arrangement according to claim 1, wherein the transportation installation is configured to automatically implement the material flow.

* * * * *